United States Patent
Baker

(10) Patent No.: US 6,857,269 B2
(45) Date of Patent: Feb. 22, 2005

(54) CAPILLARY TWO-PHASE THERMODYNAMIC POWER CONVERSION CYCLE SYSTEM

(75) Inventor: Karl William Baker, Centreville, VA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/431,826

(22) Filed: May 8, 2003

(65) Prior Publication Data

US 2004/0221579 A1 Nov. 11, 2004

(51) Int. Cl.[7] ............................................. F01K 7/34
(52) U.S. Cl. ....................................... 60/653; 60/676
(58) Field of Search .......................... 60/645, 653, 670, 60/676

(56) References Cited

U.S. PATENT DOCUMENTS

| | | | | |
|---|---|---|---|---|
| 3,972,193 A | * | 8/1976 | Stevens et al. ............... | 60/646 |
| 4,240,257 A | * | 12/1980 | Rakowsky et al. ............ | 60/531 |
| 4,367,629 A | * | 1/1983 | Cann .......................... | 60/669 |
| 4,856,288 A | * | 8/1989 | Weber ......................... | 62/129 |
| 4,898,231 A | * | 2/1990 | Miyazaki ..................... | 165/274 |
| 6,038,874 A | * | 3/2000 | van der Walt et al. ........ | 62/198 |

* cited by examiner

Primary Examiner—Hoang Nguyen
(74) Attorney, Agent, or Firm—Derrick Michael Reid

(57) ABSTRACT

A two-phase thermodynamic power system includes a capillary device, an inline turbine, and a condenser for generating output power as a generator or receiving input power as a refrigerator. The capillary device, such as a heat loop pipe or a capillary pumped loop, is coupled to the inline turbine for generating output power for power generation or for receiving input power for powered refrigeration. The capillary device receives input heat that is used to change phase of liquid received from the condenser into vapor for driving the turbine. The power system is well suited for space applications using a radioisotope heat source, using waste heat from a radioisotope power system as a heat source, waste heat from spacecraft components such as electronics as a heat source or solar energy as a heat source. The heat source is useful for driving the capillary wick as well as a superheater for increased power efficiency and lifetime operation. The power system is well suited for space receiving heat from a heat source to produce useful mechanical energy. The refrigeration system is well suited for receiving input mechanical power to the turbine for removing waste heat from a spacecraft at a low temperature and rejecting that heat into space at a higher temperature.

19 Claims, 4 Drawing Sheets

POWER GENERATING THERMAL CYCLE SYSTEM

POWER GENERATING THERMAL CYCLE SYSTEM

POWER GENERATING THERMAL CYCLE

REGRIGERATION THERMAL CYCLE SYSTEM

REFRIGERATOR THERMAL CYCLE

CAPILLARY TWO-PHASE THERMODYNAMIC POWER CONVERSION CYCLE SYSTEM

FIELD OF THE INVENTION

The invention relates to the field of thermodynamic power systems. More particularly, the present invention relates to two-phase thermal cycle systems, capillary devices, power generators, thermal condensers, and refrigerators.

BACKGROUND OF THE INVENTION

Thermodynamic power cycle systems have typically been used to generate useful work, such as in power generation systems, and used for removing heat, such as in refrigeration systems. Thermodynamic power cycles have typically been used in two ways. A first way is to turn heat input into the system into useful work as in power generation systems. A second way is to move heat from a low temperature point to a high temperature point by inputting useful energy as in refrigeration systems. Radioisotope elements are used as a heat source for space power systems. Thermoelectric power conversion systems are currently used in deep space missions. Radioisotope thermoelectric generators have thermodynamic efficiencies of seven percent.

It is desirable to increase the efficiencies and power conversion levels of space based power generators. It is also desirable to directly produce AC power and thus eliminate the need for power converters for certain applications. It is also desirable to remove waste heat at decreased temperatures by means of a refrigerator in space. Space power systems that generate AC power disadvantageously typically require the use of an additional power converter, such as in photovoltaic systems. Turbines have been used both terrestrially and in space to generate AC power. Space based dynamic power conversion cycles have been limited to single-phase Brayton systems, thermoelectrics, and photovoltaics. The overall thermodynamic efficiency of two-phase power conversion systems, such as the Rankine system, are generally greater than single-phase Brayton systems. Large terrestrial two-phase Rankine cycle systems typically operate at over thirty percent efficiency. Although the Rankine cycle has been used extensively in terrestrial applications for power generation, the Rankine power cycle has not been used in space applications because of the difficulty and complexity required to manage a two-phase power system in micro gravity.

The Rankine cycle systems are typically described using conventional temperature and entropy graphs and functional block descriptions. A typical Rankine system includes an input heat source, a boiler, a superheater, a turbine, a condenser, and a pump. Heat is input into the boiler, the working fluid gradually changes from liquid to vapor as heat is received. That is, the Rankine cycle entropy extends from a saturated liquid point to a saturated vapor point during heat addition. The heating in the boiler of a Rankine cycle system provides the working fluid flow with an infinitesimally small amount of heat input, which results in an infinitesimally small change in the quality of the flow. In the boiler of a Rankine cycle system, the vapor and liquid are carried together. The boiler provides a phase change from liquid to vapor. The input heat source heats the working fluid in the boiler generating and providing saturated vapor, which is fed into the superheater. The superheated vapor then spins the turbine for providing output work, such as electrical power. The superheater is used to ensure that the vapor entering the turbine is superheated and thus has no liquid droplets in it to avoid liquid impingement with the turbine blades while providing sufficient flow to spin the turbine to generate the desired amounts of power. The turbine provides low-pressure saturated vapor to the condenser. The condenser provides a phase change from vapor to liquid. The liquid is then pumped by the active pump into the boiler for completing the cycle. The Rankine cycle disadvantageously requires the use of an active liquid pump. Rankine cycle also disadvantageously uses a boiler to add heat to the cycle flow. For terrestrial applications gravity is used to maintain the separation of liquid and vapor in the boiler and at the active liquid pump. Maintaining this separation without gravity, in space, is difficult and typically makes Rankine power cycle systems unsuitable for space applications.

Commercial loop heat pipes and capillary pumped loops have been developed to passively control the dynamics and location of liquid and vapor interface points in micro gravity. As such, loop heat pipes and capillary pumped loops are commonly used for the thermal control of spacecraft. There are over one hundred loop heat pipes and capillary pumped loops in operation, on orbit, on spacecraft. The loop heat pipe as well as the capillary pumped loop allows for deployable condensers to be used on spacecraft as part of a two-phase heat rejection system. A loop heat pipe or capillary pumped loop includes a capillary wick that facilitates flow from a low pressure point to a high pressure point. The capillary wick is used to pressurize and drive the loop heat pipe or capillary pumped loop heat rejection system. Loop heat pipes and capillary pumped loops have pumping capabilities orders of magnitude greater than simple heat pipes. Loop heat pipes are being used on commercial satellites and are described in U.S. Pat. No. 5,743,325. The transport lines of the loop heat pipe or a capillary pumped loop heat rejection system are typically made from simple tubing that is bent and welded. Loop heat pipe and capillary pumped loop systems use Aluminum, stainless steel and other nickel based superalloys for use with ammonia as the working fluid, or use stainless steel, nickel based superalloys and copper with water as the working fluid. Deployable condensers and flexible tubing are used to configure the heat rejection system.

A capillary wick receives a saturated liquid. The liquid wets the capillary wick. It is drawn through the capillary wick because the working fluid molecules are attracted more to the capillary wick material than they are to each other. The liquid is also pushed through the capillary wick through pressurization. The capillary wick provides the separation between the high-pressure vapor and the low-pressure liquid. Heat is input on the high-pressure side of the capillary wick where the fluid is vaporized. Once liquid turns into vapor through evaporation, the volume of the working fluid increases orders of magnitude causing the pressure to increase on the high-pressure side of the capillary wick. This increase in pressure pushes the saturated vapor forward through the system. The flow cannot go backwards toward the lower pressure saturated liquid path because the pores in the capillary wick are so small that a meniscus forms in them and acts as a barrier to the high-pressure vapor. Capillary wicks with pores sizes of about one micron are commercially available. Based on the Laplace-Young equation, which is a function of pore geometry and surface tension, and using ammonia as a working fluid, a capillary wick with one-micron pores can sustain a pressure differential of approximately ten psi. With water as a working fluid pressure differentials of approximately fifty psi are possible.

The loop heat pipe is similar to a capillary pumped loop, but having different placement of the fluid reservoir. In the loop heat pipe, the reservoir is attached to the evaporator. In the capillary pumped loop, the reservoir is remotely located with respect to the evaporator. A loop heat pipe or capillary pumped loop generates fluid pumping energy through the addition of heat from an input heat source onto a capillary wick.

Two-phase power systems are the most efficient types of power systems. The two-phase liquid vapor interface management problem is solved for loop heat pipe and capillary pumped loop thermal control capillary devices. Another problem using capillary devices is reliable start up on orbit when the fluid flow is initially stagnant. Although two-phase systems have been used extensively on earth, two-phase power systems have not been used in space because of an inability for controlling the interface between the two-phases in micro gravity during steady state operation as well as transient operation. These and other disadvantages are solved or reduced using the invention.

SUMMARY OF THE INVENTION

An object of the invention is to provide a two-phase thermal cycle for use as a thermodynamic power system pressurized by a capillary device.

Another object of the invention is to provide a two-phase thermal cycle for use in a thermodynamic power system pressurized by a capillary device for driving a turbine for providing output energy.

Yet another object of the invention is to provide a two-phase thermal cycle for use in a thermodynamic power system pressurized by a capillary device for generating power during power generation.

Still another object of the invention is to provide a two-phase thermal cycle for use in a thermodynamic power system pressurized by a capillary device for receiving input power during refrigeration.

A further object of the invention is to provide a two-phase thermal cycle for use in a thermodynamic power system pressurized by a capillary device, such as a loop heat pipe.

Yet a further object of the invention is to provide a two-phase thermal cycle for use in a thermodynamic power system pressurized by a capillary device, such as a capillary pumped loop.

Another object of the invention is to provide a two-phase thermal cycle for use in a thermodynamic power system pressurized by a capillary device providing an instantaneous transition from liquid to vapor using input heat.

The system is directed to a two-phase thermodynamic power cycle system that converts heat energy to work particularly useful in space power systems. The system uses a capillary wick of a capillary device that uses input heat to generate high-pressure vapor. The high-pressure vapor is kept separate from low-pressure saturated liquid. This capillary wick facilitates the flow transition from low-pressure liquid to high-pressure vapor, instantaneously, as an effective passive pump. The system solves the problem of two-phase fluid management in micro gravity by simplifying the two-phase thermodynamic cycle system through the use of a capillary device, such as loop heat pipe or a capillary pumped loop, for two-phase fluid control. The system is a power conversion unit that receives heat from a heat source to passively drive the capillary action. The capillary action passively pressurized the system for use as a power generator or refrigeration. The system preferably includes an evaporator comprising a capillary device having a capillary wick for receiving input heat and providing a phase change, a turbine for providing or receiving power, and a condenser for radiating heat. The condenser can be one tube, for example, tens of feet long, bent in a serpentine manner, and attached to a condenser panel. The condenser tubing can also be fabricated in a conventional parallel arrangement.

The loop heat pipe or capillary pumped loop, collectively referred to as capillary devices, are preferably used in combination with a turbine to produce output or receive input power. A small turbine can be placed in the thermal cycle loop for providing output power during power generation or for receiving input power during refrigeration. The system includes necessary tubing for transport of the working fluid between components, through the superheater and condenser. The system can be used for small terrestrial solar, gas, and or geothermal power generation stations with an efficiency potentially higher than photovoltaic systems. High grade AC power can be generated directly using a turbine-rotating machine to generate power or to receive power. A space qualified loop heat pipe or capillary pumped loop with an input turbine in the vapor line with power being inputted into the turbine can initially force fluid flow through the loop heat pipe in the desired direction for initiating a cold start. Forcing the flow through the loop heat pipe in the desired direction will cause the loop heat pipe to start functioning. Once the loop heat pipe has started, the turbine can be used to provide power.

The system preferably uses spacecraft thermal control technology, including loop heat pipes and capillary pumped loops, by combining these capillary devices with a turbine. Loop heat pipes and capillary pumped loops are used for thermal control applications on spacecraft because these capillary devices allow for system integration with flexible lines, and enable deployable condensers. The system provides a two-phase dynamic power system suitable for space application. The system can be cost effectively built as a cascaded system to generate power using the waste heat from a radioisotope thermoelectric converter. This cascaded system will yield a space power system with an overall efficiency of approximately fourteen percent to provide a spacecraft with significantly more power while enabling ion propulsion with increased payload capabilities.

The system obtains pressurization of fluid flow occurring at the capillary wick. In the thermal cycle of the system, saturated vapor and liquid points are separated during the heat input phase of the cycle. That is, the working fluid abruptly changes from a saturated liquid to a saturated vapor. During heat addition, saturated fluid changes directly to saturated vapor and the quality of the flow goes directly from all liquid to all vapor. The thermal cycle process jumps from the saturated liquid point to saturated vapor point. Although this is counter intuitive, this entropy jump on the temperature and entropy diagram mirrors the physics at the liquid vapor interface of the capillary wick, where low pressure saturated liquid is physically in contact, but separated from high pressure saturated vapor. When an infinitesimally small amount of heat is added at the saturated vapor side of the capillary wick, an infinitesimally small amount of saturated vapor will be formed. At the vapor liquid interface of the thermal cycle, liquid and vapor are in contact but separated across the capillary wick. The capillary wick can be built using different types of material and in different geometries. The evaporator of a loop heat pipe or capillary pumped loop contains a capillary wick. The loop heat pipe evaporator includes a primary capillary wick and a secondary wick, the reservoir, the liquid input line, and vapor exit line, as well as the housing for the primary capillary wick. The capillary wick receives heat from an input heat source. Conventional loop heat pipe or capillary pumped loop evaporators can be used.

An optional superheater can be used to insure that the working fluid flowing into the turbine is all vapor. The flow is saturated vapor that is preferably forced through the superheater. The superheater is a heat exchanger that can, but does not necessarily have to, interface with the same heat source as the capillary wick. In practice, the superheater is a tube through which the cycle working fluid flows with several serpentine bends. This tube could simply be bolted to a heat source. The flow is then heated to yield superheated vapor. The superheater is used to heat the working fluid to ensure that no condensed droplets enter the turbine. The impingement of droplets on the turbine will eventually cause the turbine to erode. The superheated vapor is passed through the turbine.

The superheater can be used to increase power output of the device by adding heat to the flow. However any pressure increase in the flow will result in a pressure differential increase across the capillary wick. Heat can be added to the flow until the maximum sustainable differential across the capillary wick is reached. Once this limit is reached the device will fail. For a space power system, the superheater can be constructed out of several feet of serpentine tubing through which the flow is forced. This tubing can be attached to a heat source. For an isotope space system, this tubing can interface with the same isotope heat source that drives the capillary wick.

For a space-based application, the turbine can have an electromagnetic coupling for eliminating leakage around shaft seals. The superheated vapor drops in pressure as energy is extracted. The flow will then enter the condenser where heat will be transferred out to an external sink in the environment. In practice, the condenser can be a tube that the cycle flow passes through with several serpentine bends. This tube is exposed to a cold heat sink. The cold heat sink will cause the vapor to condense to liquid as the flow is forced through the condenser tubes. The flow exits the condenser as saturated liquid to enter the capillary wick as the cycle is repeated. The system provides two-phase thermodynamic operation well suited for space-based applications. These and other advantages will become more apparent from the following detailed description of the preferred embodiment.

DETAILED DESCRIPTION OF THE PREFERRED EMBODIMENT

Figure 1A:
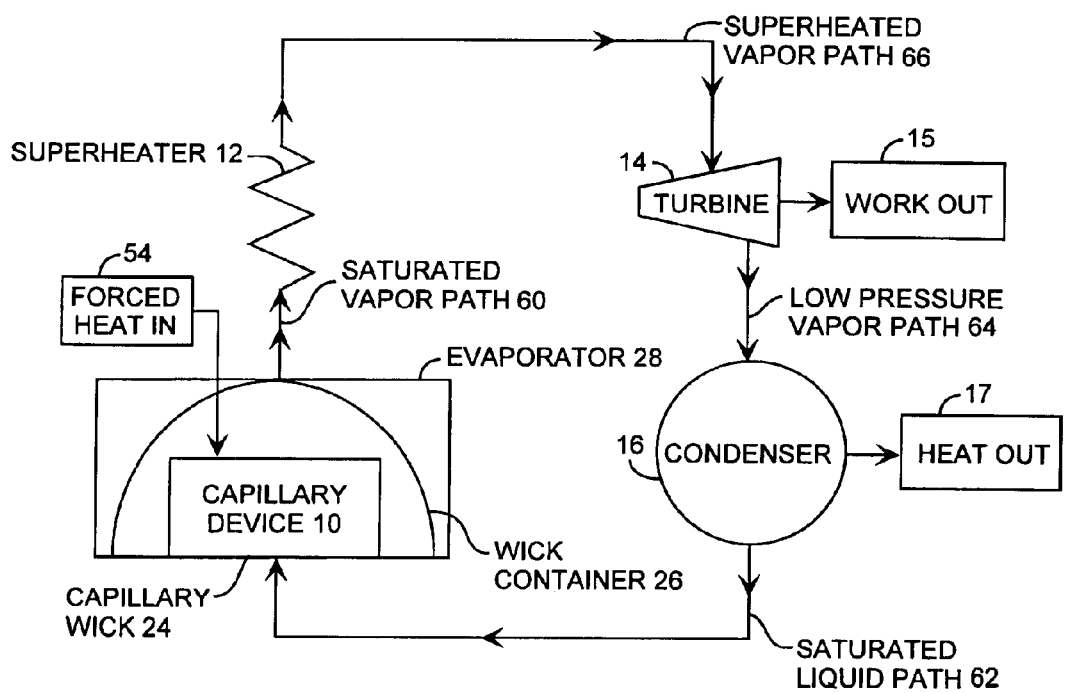
FIG. 1A is a block diagram of a power generating thermal cycle system.
Figure 1B:
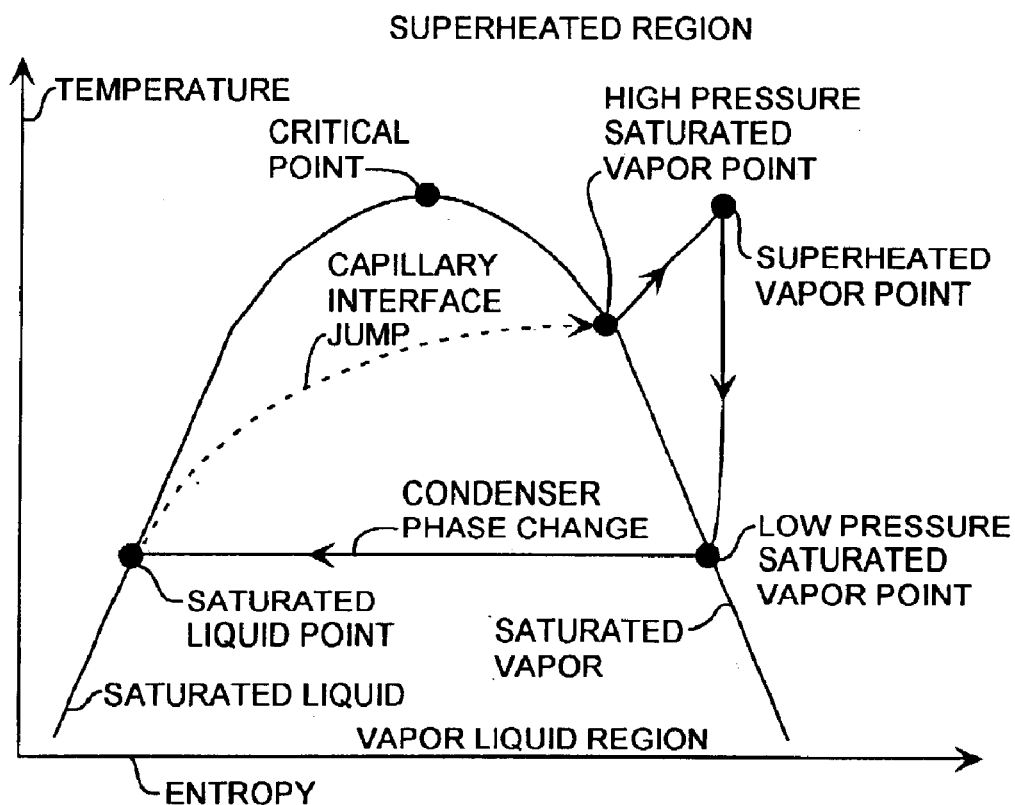
FIG. 1B is a temperature and entropy graph of a power generating thermal cycle.

An embodiment of the invention is described with reference to the figures using reference designations as shown in the figures. Referring to FIGS. 1A and 1B, a working fluid, such as amonia or water, obtains a liquid phase and a vapor phase in a two-phase power generation system. The flow starts, for example, as a saturated liquid moving along a saturated liquid path 62 from a condenser 16 to the evaporator 28 of a capillary device 10, comprising a capillary wick 24 within a wick container 26. The evaporator 28, may be, for example, the evaporator from a conventional loop heat pipe or a conventional capillary pumped loop. Forced heat 54 into the capillary device 10 evaporator serves to drive the device. This liquid is pushed to the capillary wick 24 under pressure. The capillary wick 24 provides the separation between the high-pressure saturated vapor and the low-pressure saturated liquid. Flow through the capillary wick 24 is achieved because the working fluid wets the capillary wick 24 as fluid molecules are attracted to the capillary wick 24 more than they are to each other so as to draw the working fluid through the capillary wick 24. The fluid is also pushed through the capillary wick 24 from the pressure generated at the saturated vapor side of the capillary wick 24. Heat is input into capillary wick 24 that is further connected to the evaporator 28 that is in turn connected to a saturated vapor path 60 in which working fluid is a saturated vapor. Vaporization increases the volume and pressure of the working fluid on the heated side of the capillary wick 24. The pressure pushes the working fluid am saturated vapor forward through the saturated vapor path 60. Flow moves backwards toward the saturated liquid path 62 that is blocked because the pores in the capillary wick 24 are so small that the working fluid forms meniscus in them. This serves as a barrier to the high-pressure vapor. The pressure differential on opposing sides of the capillary wick is used to circulate the flow through the entire system.

The liquid at the saturated liquid point and vapor at the saturated vapor point are completely separated during the heat addition to the capillary wick 24. During heat addition, saturated liquid changes directly to saturated vapor crossing the capillary interface jump. Crossing the capillary interface causes the working fluid to go directly from a saturated liquid to a maturated vapor without a mixture of vapor and liquid ever occurring during the heat addition process. That is, the capillary interface jump, on the temperature and entropy graph FIG. 1B, mirrors the physics at the liquid vapor interface of the capillary wick 24, where low pressure liquid is physically in contact, but separated from high pressure vapor. That is, at the vapor liquid interface the liquid and vapor are in contact but separated. After heat addition, the working fluid is at the saturated vapor point.

The saturated vapor flow is then heated by the superheater 12 to produce superheated vapor at the superheated vapor point. The vapor flows from the superheated vapor point through the turbine 14, extracting work and simultaneously lowering the pressure of the working fluid flow, which reaches the low pressure saturated vapor point. The saturated vapor path flow is preferably connected to a superheater 12. The saturated vapor can be heated by the superheater 12 connected to a superheated vapor path that is connected to a turbine 14 to produce power as work out 15. The superheater 12 is a heat exchanger that may interface with the same heat source as the capillary wick 24, such as a radioisotope heat source on a spacecraft. The superheater 12 is preferably a tube through which the working fluid flows with several serpentine bends. The working fluid flow is heated to be a superheated vapor. The superheated vapor flows through the superheated vapor flow path 66. The superheater is used to heat the working fluid to ensure that no condensed droplets enter the turbine to prevent erosion of the turbine 14. The superheated vapor path provides high-pressure superheated vapor to drive the turbine 14. The superheated vapor flow drops in pressure through the turbine 14 as energy is extracted in the form of mechanical energy, through a shaft, not shown. This mechanical energy can be used to perform useful work such as work out 15 for turning a generator to make electricity. A low-pressure vapor flow path 64 is connected to the low-pressure side of the turbine 14. The working fluid will be nearly at saturation as it flows through the low-pressure vapor path 64 out of the turbine 14. The low-pressure vapor path 64 is connected to the condenser 16. The working fluid flow will then enter the condenser 16 from the low-pressure vapor path 64. In the condenser 16, the working fluid will change phase, from a low-pressure vapor to a low-pressure liquid. Heat will be transferred out to an external sink in the environment as heat out 17. The working fluid flow enters the condenser 16 as low-pressure saturated vapor at the low-pressure saturated vapor point. As the working fluid flow pauses through the condenser 16, the working fluid undergoes a condenser phase change from vapor to liquid. The condenser 16 can be a tube through which working fluid flow passes using several serpentine bends. This tube is exposed to a cold heat sink, such as outer space. The exit of the condenser 16 is connected to the saturated liquid path 62. The saturated liquid path 62 is connected to capillary wick 24. The working fluid flows from the condenser 16 through the saturated liquid path 62 to the capillary wick 24, and the cycle is repeated as the working fluid passes through the system for power generation.

Figure 2A:
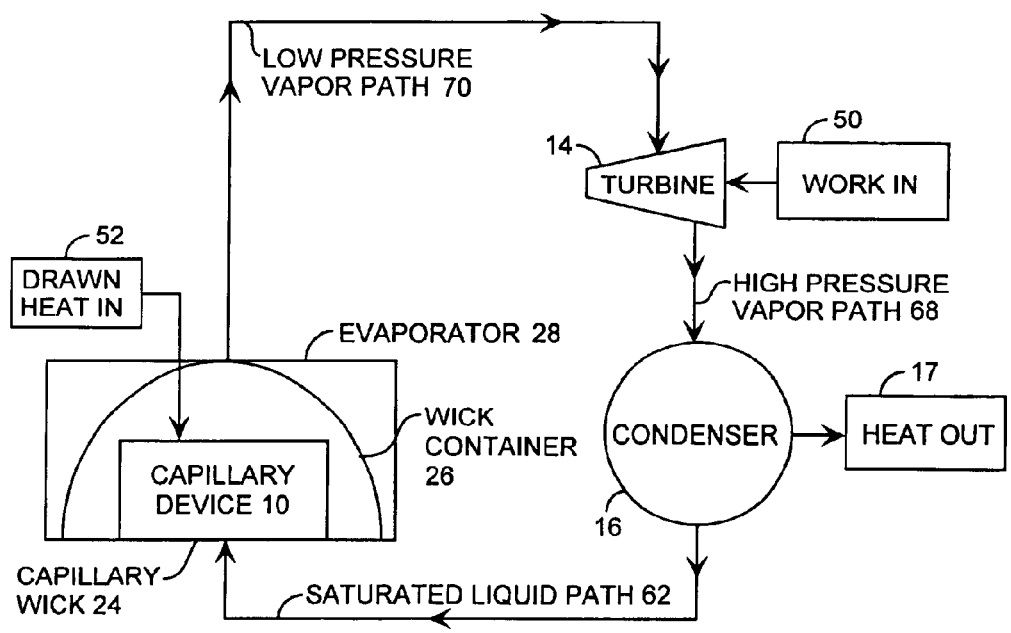
FIG. 2A is a block diagram of a refrigeration thermal cycle system.
Figure 2B:
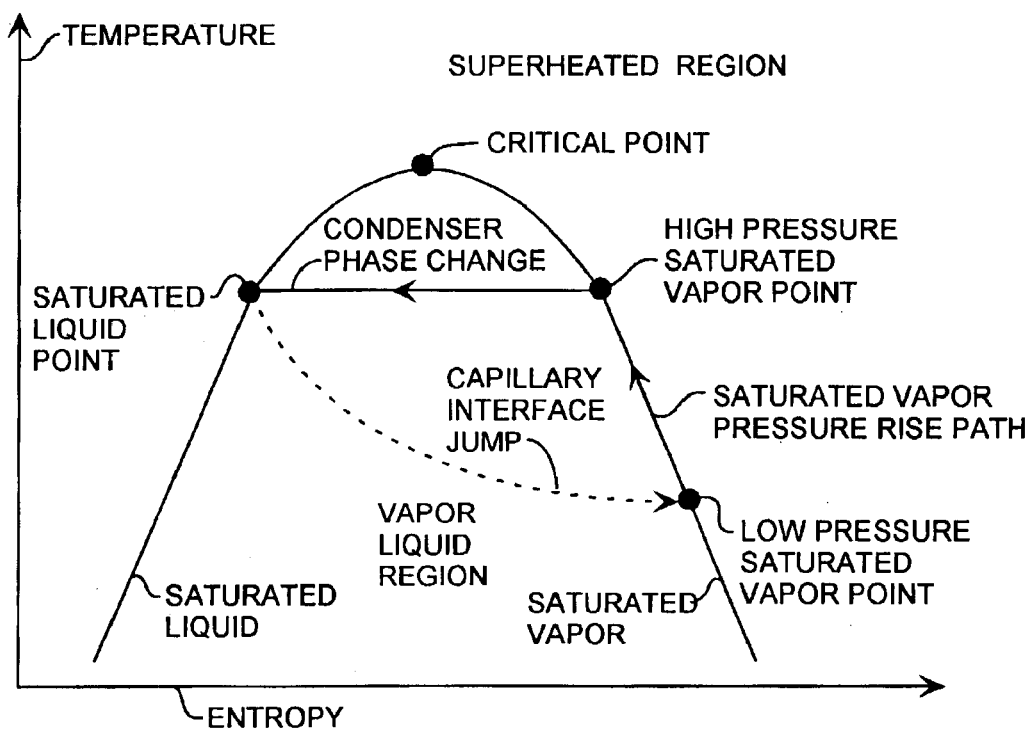
FIG. 2B is a temperature and entropy graph of a refrigeration thermal cycle.

Referring to FIGS. 2A and 2B, the working fluid again obtains a liquid phase and a vapor phase in a two-phase thermodynamic refrigeration system. A flow of saturated liquid moves through the saturated liquid path 62. This liquid is pushed to the capillary wick 24. Again, the capillary wick 24 provides the separation between the high-pressure vapor and the low-pressure liquid. Low-pressure saturated vapor flows through the low-pressure vapor path 70 to the turbine 14. Work in is input into the turbine 14, such as by a turning shaft from a motor, not shown. As the working fluid flows through the turbine 14, the pressure of the flow is increased. Saturated high-pressure vapor in a high-pressure vapor path 68 then enters the condenser 16. The vapor temperature is higher than the environment around the condenser 16, which causes the working fluid flow to condense, changing from maturated vapor to saturated liquid. The saturated liquid then flows through the maturated liquid path 62 and returns to the capillary wick 24 structure to repeat the refrigeration cycle.

As with the power generation system, the liquid at the maturated liquid point and vapor at the saturated vapor point are completely separated at the capillary wick 24. Heat addition is accomplished because the temperature of the evaporator 28 is significantly lower than the environment around it. At the capillary wick 24, the working fluid changes phase from a saturated liquid to a low-pressure saturated vapor that is pulled by the turbine 14. With heat addition maturated liquid changes directly to saturated vapor crossing the capillary interface jump. Crossing the capillary interface, causes the working fluid flow to go directly from a saturated liquid to a saturated vapor. Liquid and vapor separation is always maintained. After heat addition, the working fluid is at the low-pressure saturated vapor point. Flowing through the turbine causes the pressure of the flow to increase and causes the flow to move along the saturated vapor pressure rise path from the low-pressure saturated vapor point to the saturated vapor point where the flow enters the condenser 16. With vapor condensing to liquid, the refrigeration cycle moves along the condenser phase change path.

The power generation system and refrigeration system both rely on the capillary wick 24 to maintain separation between the incoming liquid and outgoing vapor. The pressure differential across the capillary wick is a result of heat from the heat source heating 52 or 54 only side of the capillary wick 24. In both systems, a condenser 16 is used to condense vapor into liquid that is fed into the capillary wick 24. Both systems use a turbine 14 that is used to either provide power during power generation or for receiving power during refrigeration. Both systems are characterized as a two-phase thermodynamic system using a capillary wick 24, turbine 14, and condenser 16. The condenser 16 dissipates heat, shown as heat out. The turbine 14 is connected to a shaft, shown as work out for the power generation system, or shown as work in for refrigeration.

Efficiency calculations show that the system is capable of generating electrical power between the temperatures of 120° C. to 4° C., at an overall efficiency of 7% with respect to an ideal Endo Reversible Carnot efficiency of 16%. The system can be used for generating power from a low-grade heat source in space. The primary application of interest is to combine the system as a secondary power system, attached and cascaded to the cold side of a radioisotope power system, such as a thermoelectric generator. A cascaded system would double the power output of a radioisotope thermoelectric generator and could also be used to provide AC power without conversion. The overall thermodynamic efficiency of State-Of-the-Art Radioisotope Thermoelectric Generator (RTG) systems is on the order of 7%. This new system could be attached in a cascaded manner and operate on the waste heat from the RTG. Operating in this way, the two-phase thermodynamic capillary-turbine-condenser cycle would generate power at an efficiency of 7%. This would nearly double the power output of the cascaded system versus a standalone RTG. This additional power would enable better ion propulsion systems and more substantial payload capabilities for planetary exploration.

The efficiency of the two-phase thermodynamic capillary-turbine-condenser cycle can be calculated using existing loop heat pipes or capillary pumped loops used with a turbine. Efficiency calculations are recited here for a two-phase thermodynamic capillary-turbine-condenser cycle with water as a working fluid. It is assumed that the turbine has a component efficiency of 80%. The condenser consists of parallel tubes approximately 1.0 cm inner diameter. Surface tension of water is Sigma=0.06 N/m. Latent heat of the water L=2208 kJ/kg=2208000 J/kg. The pore radius of capillary wick is r=0.0000006 m. The pressure drop through the loop beat pipe evaporator is $Dp_{evap}$=1.0 psi. The pressure drop through the condenser will be $Dp_{rad}$=1 psi. The low temperature of the system in the condenser will be $T_{low}$=4° C. through the saturated liquid path. Input heat to the evaporator is Q=2000 W. Sink temperature is $T_{sink}$=0° K. The condenser radiates heat from two sides. The condenser emissivity is e=0.90. Condenser view factor to space is F=1. The Laplace-Young equation reduces to DP=2 Sigma/r= 2*0.06/0.0000006=200000 N/m²=2 bars=29 psi. This pressure difference DP is the maximum that the capillary wick can sustain. This limits the performance of the system. To produce power, it is desirable to expend as much of this differential pressure as possible.

The maximum pressure drop that can be taken across the turbine is $Dp_{turb}$=DP−$Dp_{evap}$−$Dp_{rad}$=27.0 psi=1.9 bars. The pressure of saturated water vapor at $T_{low}$=4° C., is $P_{low}$= 0.008 bars. Temperature of saturated water vapor Where $P_{high}$=1.9 bars, is $T_{high}$=118° C. The enthalpy of saturated vapor at $T_{high}$=118° C., is $h_{high}$=2703 kJ/kg. The enthalpy of saturated vapor at $T_{low}$=4° C., is $h_{low}$=2509 kJ/kg. The term Dh=$h_{high}$−$h_{low}$=194 kJ/kg=194000 J/kg. The mass flow rate is Mdot=Q/L=2000/2208000=9.06e-4 kg/s=0.906 gm/s. The power taken out of flow is $Po_{flow}$=Mdot*Dh=176 W. The actual power out is $P_{out}$=$Po_{flow}$ * $Eff_{Trub}$=176*0.8=141

W. The overall efficiency is ETA=$P_{out}/Q$*100 m (141/2000) *100=7.03%. When comparing with Carnot: $ETA_C$=1−$T_{low}/T_{high}$)=1−((4+273)/(120+273))=29.5%, with $E_{CompCarnot}$=ETA/$ETA_C$=7.03/29.5=23.8%. Carnot allows for heat transfer without temperature drops into and out of the engine that is not realistic or possible. Endoreversible Carnot accounts for the temperature drops required to transfer heat into and out of the engine. Highly efficient real world power systems approach Endoreversible efficiencies, with $ETA_{Endo}$=1−√($T_{low}/T_{high}$)=1−√(277/393)=16.1%, and $E_{CompEndo}$=ETA/$ETA_{Endo}$=7.03/16.1*100=43.8%. A decrease in pore size of the capillary wick, without significantly increasing pressure drop through the capillary wick would directly increase overall efficiency of the power cycle. The condenser size and waste heat is $Q_{waste}$=Q−$Po_{flow}$=2000−176=1824 W.

Assuming that the flow through the condenser has a very low-pressure drop, the average condenser temperature will be $T_{low}$=4° C.=277° K., with $Q_{waste}$=F*e*SBC*$A_{rad}$*($T_{low}^4$−$T_{sink}^4$)=1824=1*0.9*5.67e−8*A*($277^4$−$0^4$). Solving for Area, A=6.07 m². Using a two sided condenser, A=3.04 m². With a square condenser, the square root yields the length of each side of the condenser, $L_{rad}$=1.74 m. This is a suitable size for a deployable panel and is actually much smaller than the deployable condenser panels used on some large commercial spacecraft.

The system is directed to using a two-phase thermodynamic working fluid. Any of the working fluids typically used for heat pipes and capillary devices would be acceptable. The capillary wick-turbine-condenser in a thermodynamic power system can be used as a power generator or refrigerator system. The system uses a capillary device that provides a transition from liquid to vapor. The system can be built using conventional loop heat pipe and capillary pumped loop commercial hardware. Using these flight-qualified devices provides a proven system for the management of a two-phase working fluid in micro gravity. The efficiency of the two-phase dynamic power cycle can approach the efficiency of a Eankine cycle operating at the same temperature difference, without the cost, expense, and development of a complex micro gravity two-phase fluid management system, nor with the use of active pumps and boilers. The system can be a power conversion system for deep space missions operating off the waste heat of an isotope heat source where thermoelectric conversion systems are typically used.

The system enables management of two-phase fluid physics in micro gravity. Also operation in the gravity of earth will have minimal influence on system operation because the capillary device can support high-pressure differentials relative to gravity. This allows for ground testing of space hardware. Commercial loop heat pipes and capillary pumped loops control the dynamics and location of liquid and vapor in micro gravity in a passive manner. Loop heat pipes and capillary pumped loop evaporators can be bolted on to a heat source and interface with the rest of the system by flexible tubing for system integration. Flexible tubing 60, 62, 64, 66, 63, and 70, can be used between all the components of the system for design flexibility. Flexible tubing 60, 62, 64, 66, 68, and 70, can be used to connect the elements of the system to a conventional deployable condenser that can be used on a spacecraft.

The system can be built using commercially available loop heat pipes and capillary pumped loops, with ammonia as a working fluid. A system built using this hardware will be capable of transporting 2000 Watts of energy. This is within the range of typical isotope power sources. Because loop heat pipes and capillary pumped loops are produced in significant numbers, the cost is relatively low. The system can be operated as a heat pump refrigerator. The system can be used as a heat pump that is to transport heat from a low temperature to a high temperature by inputting mechanical energy into a turbine. The heat rejection capability of the system could be increase or decreased at specific times in the spacecraft orbit. This allows for significant design flexibility with respect to condenser sizing and spacecraft operation. The system can be used for terrestrial applications as a heat pump for heating, air conditioning, and refrigeration. Those skilled in the art can make enhancements, improvements, and modifications to the invention, and these enhancements, improvements, and modifications may nonetheless fall within the spirit and scope of the following claims.

What is claimed is:

1. A system for receiving input heat from a heat source and for providing a liquid state and a first vapor state at a first vapor pressure and a second vapor state at a second vapor pressure of a two-phase working fluid, the system comprising, a capillary device for receiving the input heat from the heat source and phase changing and separating the working fluid from the liquid state to the first vapor state at a first vapor pressure, a turbine for converting energy while passing the working fluid from the first vapor state at the first vapor pressure to the second vapor state at the second vapor pressure, a condenser for phase changing the working fluid in the second vapor state at the second vapor pressure into the liquid state while rejecting waste heat, and tubing for inline interconnecting the capillary device and the turbine and the condenser.

2. The system of claim 1 wherein, the capillary device comprises a capillary wick.

3. The system of claim 1 wherein, the capillary device comprises a capillary wick having one micron pores.

4. The system of claim 1, wherein, the system is a power generator, the turbine converts energy by extracting energy from the working fluid to produce output power as work out, and the first vapor pressure is greater than the second vapor pressure.

5. The system of claim 1, wherein, the system is a refrigerator for receiving input power as work in, the turbine converts energy by receiving the input power and imparts energy into the working fluid, and the first vapor pressure is lesser than the second vapor pressure.

6. The system of claim 1, wherein, the system is a power generator, the turbine converts energy by extracting energy from the working fluid to produce output power as work out, and the first vapor pressure is greater than the second vapor pressure, the system further comprising, a superheater for heating the working fluid after passing through the capillary device and before passing through the turbine for increasing the first vapor pressure of the working fluid.

7. The system of claim 1, wherein, heat is radiated from the condenser.

8. A generator for receiving input heat from a heat source and for providing a saturated liquid state and a saturated vapor state at a high-pressure and a saturated vapor state at a low-pressure of a two-phase working fluid, the system for generating power as a power generator, the system comprising, a capillary device for receiving the input heat from the heat source and phase changing the working fluid from the saturated liquid state to the saturated vapor state at a high vapor pressure, a turbine for extracting energy while passing the working fluid in the saturated vapor state from the high vapor pressure to the low second vapor pressure, the turbine being spun by the working fluid in the saturated vapor state for generating output power as work out, a condenser for phase changing the working fluid in the saturated vapor state at the second vapor pressure into the saturated liquid state, and tubing for inline interconnecting the capillary device and the turbine and the condenser.

9. The generator of claim 8, wherein, the condenser radiates waste heat as heat out.

10. The generator of claim 8, further comprising, a superheater for heating the working fluid between the capillary device and the turbine for heating the working fluid from the saturated vapor state at the high-pressure into a superheated vapor state, wherein, the turbine receives the working fluid in the superheated vapor state at a superheater vapor pressure for extracting energy from the working fluid while cooling the working fluid from the superheated vapor state into the saturated vapor state at the low vapor pressure.

11. The generator of claim 8, further comprising, a superheater receiving heat from the heat source and for heating the working fluid between the capillary device and the turbine for heating the working fluid from the saturated vapor state at the high-pressure into a superheated vapor state, wherein, the turbine receives the working fluid in the superheated vapor state at a superheater vapor pressure for extracting energy from the working fluid while cooling the working fluid from the superheated vapor state into the saturated vapor state at the low vapor pressure.

12. The generator of claim 8, wherein, the heat source is a radioisotope heat source, waste heat from spacecraft electronics or solar.

13. The generator of claim 8 wherein, the heat source is spacecraft electronics.

14. The generator of claim 8 wherein, the heat source is the sun.

15. The generator of claim 8, wherein, the system is for powering a spacecraft, the heat source is selected from the group consisting of a radioisotope power system, or spacecraft electronics or solar radiation, and the condenser radiates heat out for rejection of waste heat into outer space.

16. A refrigerator for receiving input heat from a heat source and for providing a saturated liquid state and a saturated vapor state at a high-pressure and a saturated vapor state at a low second pressure of a two-phase working fluid, the refrigerator for receiving power for cooling, the refrigerator comprising, a capillary device for receiving the input heat from the heat source and phase changing the working fluid from the saturated liquid state to the saturated vapor state at the low vapor pressure, a turbine for receiving energy while passing the working fluid in the saturated vapor state from the low vapor pressure to the high vapor pressure, a condenser for phase changing the working fluid in the saturated vapor state at the high vapor pressure into the saturated liquid state, and tubing for inline interconnecting the capillary device and the turbine and the condenser.

17. The refrigerator of claim 16, wherein, the condenser radiates heat out.

18. The refrigerator of claim 16, wherein, the heat source is spacecraft electronics.

19. The refrigerator of claim 16, wherein, the refrigerator is for cooling a spacecraft, the heat source is spacecraft electronics, and the condenser rejects heat out for radiation into outer space.

* * * * *